United States Patent
Heywood et al.

(10) Patent No.: US 6,799,317 B1
(45) Date of Patent: Sep. 28, 2004

(54) INTERRUPT MECHANISM FOR SHARED MEMORY MESSAGE PASSING

(75) Inventors: Patricia E. Heywood, Hopewell Junction, NY (US); Su-Hsuan Huang, Fishkill, NY (US); Janet Morgan, Portland, OR (US); William G. Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 09/604,310

(22) Filed: Jun. 27, 2000

(51) Int. Cl.⁷ .................................................. G06F 3/00
(52) U.S. Cl. ...................... 719/313; 719/312; 710/260
(58) Field of Search ................................. 709/310, 312, 709/313, 314, 215, 216, 236, 237; 712/30; 711/153; 710/260; 719/312, 313

(56) References Cited

U.S. PATENT DOCUMENTS

| | | | | |
|---|---|---|---|---|
| 5,123,094 A | * | 6/1992 | MacDougall | 712/30 |
| 5,179,702 A | | 1/1993 | Spix et al. | |
| 5,214,759 A | | 5/1993 | Yamaoka et al. | |
| 5,230,051 A | * | 7/1993 | Quan | 709/312 |
| 5,276,896 A | * | 1/1994 | Rimmer et al. | 709/216 |
| 5,283,869 A | * | 2/1994 | Adams et al. | 709/237 |
| 5,313,638 A | | 5/1994 | Ogle et al. | |
| 5,333,269 A | * | 7/1994 | Calvignac et al. | 709/215 |
| 5,357,612 A | | 10/1994 | Alaiwan | |
| 5,434,975 A | | 7/1995 | Allen | |
| 5,469,549 A | | 11/1995 | Simpson et al. | |
| 5,581,705 A | | 12/1996 | Passint et al. | |
| 5,602,998 A | | 2/1997 | Alferness et al. | |
| 5,617,537 A | | 4/1997 | Yamada et al. | |
| 5,652,885 A | | 7/1997 | Reed et al. | |
| 5,754,856 A | | 5/1998 | Klein | |
| 5,781,741 A | * | 7/1998 | Imamura et al. | 709/236 |
| 5,835,764 A | | 11/1998 | Platt et al. | |
| 5,848,295 A | | 12/1998 | Anderson et al. | |
| 5,867,656 A | | 2/1999 | Iwasaki et al. | |
| 5,944,788 A | * | 8/1999 | Krantz et al. | 709/213 |
| 5,983,266 A | * | 11/1999 | Tadman et al. | 709/216 |
| 6,029,205 A | * | 2/2000 | Alferness et al. | 709/310 |
| 6,148,361 A | * | 11/2000 | Carpenter et al. | 710/260 |
| 6,247,091 B1 | * | 6/2001 | Lovett | 710/260 |
| 6,314,501 B1 | * | 11/2001 | Gulick et al. | 711/153 |
| 6,629,152 B2 | * | 9/2003 | Kingsbury et al. | 709/313 |

OTHER PUBLICATIONS

Klaiber et al. "A Comparison of Message Passing and Shared memory Architectures for Data Parallel Programs" 1994 IEEE, pp. 94–105.*

LeBlanc et al. "Shared Memory vs. Message Passing in Shared–Memory Multiprocessors" 1992 IEEE, pp. 254–263.*

LeBlanc "Structured Message Passing on a Shared–Memory Multiprocessor" 1988 IEEE, pp. 188–194.*

* cited by examiner

Primary Examiner—St. John Courtenay, III
Assistant Examiner—Van Nguyen
(74) Attorney, Agent, or Firm—Lawrence D. Cutter; Venable Baetjer Howard & Civiletti LLP

(57) ABSTRACT

A method for transparently handling messages originating from local shared memory and from an external source. A device driver allows the local sender to identify and wake up a waiting receiver task thread, simulating a packet arrival hardware interrupt. Upon awakening, the receiver task thread examines both shared memory and hardware message queues. The method can use a software routine that simulates handling of an occurrence of a hardware interrupt. The method invokes a local notify system service module that passes a window number identifying a receiving task. The method invokes a wake thread module that passes awakens a thread associated with the window number, and examines the shared memory buffer for receipt of the local source message. The method then copies the local source message from the shared memory buffer to the receiving task.

9 Claims, 6 Drawing Sheets

INTERRUPT MECHANISM FOR SHARED MEMORY MESSAGE PASSING

FIELD OF THE INVENTION

The invention relates to multiprocessor computers and more particularly to a message passing interface (MPI) application programming interface (API) for passing messages between multiple tasks or processes. The present invention is even more particularly related to message passing using a shared memory buffer.

TRADEMARKS

S/390 and IBM are registered trademarks of International Business Machines Corporation, Armonk, N.Y., U.S.A. and Lotus is a registered trademark of its subsidiary Lotus Development Corporation, an independent subsidiary of International Business Machines Corporation, Armonk, N.Y. Other names may be registered trademarks or product names of International Business Machines Corporation or other companies.

BACKGROUND

Message Passing Interface (MPI) defines a standard application programming interface (API) for using several processes at one time to solve a single large problem called a "job" on a symmetric multiprocessor and often multi-node computer (i.e., commonly one process per node). Message passing is equally applicable however to a uniprocessor computer. Each job can include multiple processes. A process can also commonly be referred to as a task. Another software structure analogous to a task is a thread, which can be thought of as a small software component used in multi-tasking, multi-threaded software systems.

Each process, task or thread can compute independently except when it needs to exchange data with another task. When the process, task or thread needs to pass data from, e.g., one task to another, the process is known as passing a "message." Examples of symmetric multiprocessor computers include, e.g., an IBM RISC System 6000/SP available from IBM Corporation, Armonk, N.Y., and supercomputers available from Cray, Silicon Graphics, Hewlett Packard, Thinking Machines, and other computers from such companies as SUN Microsystems, Hewlett Packard, Intel, and the like.

Specifically, a programmer can use an explicit MPI_SEND to identify what data from the memory of a source task is to be sent as a given message. The programmer can also use an explicit MPI_RECV at a destination task to identify where the data is to be placed in the receiver memory.

To simplify the description which follows, sending of messages will be described although the same processing would apply to the receiving of messages. To send a message, data is gathered from memory and fed to a transport layer at the rate that the transport layer is able to accept. Bytes of a message are forwarded in chunks which can be known as packets and the transport layer can dictate the size of each chunk. When the transport layer is ready to accept N bytes, then N bytes are copied from the proper memory locations into a transport buffer which can be referred to as a "pipe." The data gather logic delivers a specific number of bytes at each activation and then at the next activation, picks up where it left off to deliver more bytes.

Receiving a message is a mirror image of the sending of one. Some number of bytes becomes available from a pipe and must be distributed. It would be apparent to those skilled in the art that the concepts involved in sending and receiving are so closely related that to understand one is to understand the other.

The MPI standard was designed for distant communication, i.e., for message passing between tasks executing on separate nodes. This type of message passing is referred to as internode message passing. When a sending and receiving task are located on the same node, message passing can be achieved by intranode message passing. Alternatively, for intranode communication, use of shared memory buffers for inter process or inter task communication is possible. Unfortunately, no provision exists for permitting transparent use of communication from both local sending tasks (intranode) and external sending tasks (internode) to a local receiving task.

U.S. Pat. No. 5,434,975 to Allen ("Allen"), the contents of which are incorporated herein by reference in their entireties, discloses a conventional IPC system. Conventionally, when a plurality of tasks, associated with a common processor node in, e.g., a uniprocessor or a symmetric multiprocessor computer system, sought to communicate with one another, various means of interprocess communication (IPC) could be used. For example, Allen describes a conventional shared memory (only) message passing system including a sender/receiver pair with message queues and "signaling" from the sender to receiver. Allen uses a Unix IPC called a semaphore. The receiver in Allen has only one source of messages, i.e., shared memory. Unfortunately, Allen does not teach or suggest a system that supports message passing where messages originate from two sources where one of the sources is not local so there is a need for something different than a conventional signal, since the IPC signal can only be generated for a local connection.

U.S. Pat. No. 5,652,885 to Reed et al. ("Reed"), the contents of which are incorporated herein by reference in their entireties, discloses a system using a Unix datagram socket as a signaling mechanism, and messages are expected to be communicated entirely via shared memory. The receiver either waits for a select or for a signal. Reed also does not address message passing where messages originate from non-local sources.

U.S. Pat. No. 5,835,764 to Platt, ("Platt"), the contents of which are incorporated herein by reference in their entireties, discloses a "remote-procedure-call-like" mechanism in which various threads are suspended until their dependent (synchronous) functions are completed. Unfortunately, Platt also does not teach or suggest a system or method that handles a multiplicity of message source types (i.e. local and distant).

U.S. Pat. No. 5,469,549 to Simpson, ("Simpson"), the contents of which are incorporated herein by reference in their entireties, discloses a system supporting communication via partitioned shared memory. Unfortunately, Simpson does not teach or suggest any external interfaces.

U.S. Pat. No. 5,313,638 to Ogle ("Ogle"), the contents of which are incorporated herein by reference in their entireties, discloses a system supporting UNIX semaphore synchronization, i.e., message passing into slots controlled by a semaphore. Unfortunately, Ogle does not teach or suggest any support for message passing from external device sources.

It is desired that an improved method be provided to permit transparent receipt of communications to local receiving tasks from local sending tasks and external sending tasks.

SUMMARY OF THE INVENTION

Briefly, the present invention provides a system, method and computer program product for transparently handling messages originating from local shared memory and from an external source. Conventional approaches supported shared memory only, or external source only as the only mechanism. The present invention includes a local sender task putting messages into shared memory, and a distant sender task sending messages via a communications link. The receiver task can initially be waiting for a packet arrival interrupt from the communication link. A hardware interrupt advantageously can call a software service notification function to wake the waiting thread of the receiver task (this waiting thread in one embodiment could be a Dijkstra semaphore). The software service notification function can be provided as part of an operating system (OS) by a kernel function, or more commonly, by a device driver which can support the communication link. The present invention can include adding an additional function to the device driver which can allow the local sender to identify and wake up the waiting receiver task thread, thereby simulating a packet arrival hardware interrupt. When the receiver task thread awakes, it can examine both shared memory and hardware message queues for work to do.

In an example embodiment of the present invention, a method is disclosed for transparently handling message passing from a plurality of local and external source tasks, the method providing a software routine that simulates handling of an occurrence of a hardware interrupt, the method including the steps of copying a local source message into a shared memory buffer from a local sending task, invoking a local notify system service module including passing a window number identifying a receiving task, invoking a wake thread module awakening a thread associated with the window number, examining the shared memory buffer for receipt of the local source message, and copying the local source message from the shared memory buffer to the receiving task.

In one embodiment of the present invention, the method can further include sending an external source message on a communications link by an external sending task, receiving the external source message from the communications link at a communication adapter, triggering a hardware interrupt by the communication adapter, copying the external source message into an external message buffer from the communication adapter, invoking a first level interrupt handler (FLIH) handling the hardware interrupt, invoking a second level interrupt handler (SLIH) handling the FLIH, invoking the wake thread module awakening a thread associated with the receiving task, examining the external message buffer for receipt of the external source message, and copying the external source message from the external message buffer to the receiving task.

In an embodiment of the present invention, a system for message passing from a plurality of local and external sources, is disclosed including a message passing network, a plurality of nodes coupled to the message passing network, a plurality of tasks executing on the plurality of nodes, a local sending task of the plurality of tasks on a first of the plurality of nodes, a receiving task of the plurality of tasks on the first of the plurality of nodes, an external sending task on a second of the plurality of nodes, an external source message handling service associated with the first of the plurality of nodes that enables the external sending task to pass an external source message from the external sending task to the receiving task, wherein the external sending task sends an external source message over the message passing network to a communication adapter associated with the first of the plurality of nodes, wherein the communication adapter can store the external source message in an external message buffer and creates a hardware interrupt, wherein the hardware interrupt invokes a first level interrupt handler (FLIH), wherein the FLIH invokes a second level interrupt handler (SLIH), wherein the SLIH invokes a wake thread module that wakes a thread associated with the receiving task that causes the receiving task to examine the external message buffer to receive the external source message, and a local notify system service associated with the first of the plurality of nodes that enables the local sending task to pass a local source message from the local sending task to the receiving task, including a copier module that copies the local source message to a shared memory buffer and a notification module that invokes the wake thread module that awakens a thread associated with the receiving task notifying the receiving task of the local source message in the shared memory buffer.

In an embodiment of the invention, the local notify system service is part of a device driver. In another embodiment, the local notify system service is part of an operating system. In another embodiment, the local notify system service is part of a database management system. In another embodiment, the local notify system service is part of a middleware application.

In an example embodiment of the invention, a system is disclosed having a first level interrupt handler (FLIH) that is triggered by a device event, wherein the FLIH invokes a second level interrupt handler (SLIH), wherein the SLIH invokes a wakeup thread module that awakens a receiving task that is awaiting the device event, the system including a software component that allows a local sending task to invoke the wakeup thread module notifying the receiving task of an event.

In an embodiment, the device event includes a hardware device event including an arrival of an external message from an external source sending task via a communications adapter, an end of tape event from a tape drive, or a new track event from a compact disk read only memory CD-ROM drive.

In an embodiment, the event can include copying of a local source message into a shared memory buffer from a local source sending task, completion of a task, or killing a task.

In an embodiment, the system can implement the message passing interface (MPI) message passing standard.

In an embodiment, the system is implemented on a symmetric multiprocessor system that implements a network connection to a message passing network.

In an embodiment, the system is implemented on a uniprocessor computer system running a multi-tasking operating system wherein a sending process and a receiving process are managed by the uniprocessor system and the sending process and the receiving process communicate by message passing inter process communication.

In an example embodiment of the present invention, a device driver is disclosed for a system having an external source message handling service that enables an external sending task to pass an external source message from the external sending task to a receiving task, wherein the external sending task sends an external source message over a message passing network to a communication adapter associated with the receiving task, wherein the communication adapter stores the external source message in an external message buffer and creates a hardware interrupt, wherein the hardware interrupt invokes a first level interrupt handler (FLIH), wherein the FLIH invokes a second level interrupt handler (SLIH), wherein the SLIH invokes a wake thread module that wakes a thread associated with the receiving task that causes the receiving task to examine the external message buffer to receive the external source message, wherein the device driver includes a local notify system service that enables a local sending task to pass a local source message from the local sending task to the receiving task, including a copy module that copies the local source message to a shared memory buffer, and a notification module that invokes the wake thread module that awakens a thread associated with the receiving task, and notifies the receiving task of the local source message in the shared memory buffer.

In an example embodiment of the present invention, an operating system including a kernel having a plurality of system services for a system having an external source message handling service that enables an external sending task to pass an external source message from the external sending task to a receiving task, wherein the external sending task sends an external source message over a message passing network to a communication adapter associated with the receiving task, wherein the communication adapter stores the external source message in an external message buffer and creates a hardware interrupt, wherein the hardware interrupt invokes a first level interrupt handler (FLIH), wherein the FLIH invokes a second level interrupt handler (SLIH), wherein the SLIH invokes a wake thread module that wakes a thread associated with the receiving task that causes the receiving task to examine the external message buffer to receive the external source message, wherein the plurality of system services includes a local notify system service that enables a local sending task to pass a local source message from the local sending task to the receiving task, including a copy module that copies the local source message to a shared memory buffer, and a notification module that invokes the wake thread module that awakens a thread associated with the receiving task, and notifies the receiving task of the local source message in the shared memory buffer.

In an example embodiment of the present invention, a computer program product embodied on a computer readable media including program code means including program logic for transparently handling message passing from a plurality of internal and external sources, including program code means for enabling a computer to send an external source message on a communications link from an external sending task, program code means for enabling the computer to receive the external source message from the communications link at a communication adapter, wherein the communication adapter triggers a hardware interrupt upon receipt of the external source message, program code means for enabling the computer to copy the external source message into an external message buffer from the communication adapter, program code means for enabling the computer to invoke a first level interrupt handler (FLIH) handling the hardware interrupt, program code means for enabling the computer to invoke a second level interrupt handler. (SLIH) handling the FLIH, program code means for enabling the computer to invoke a wake thread module awakening a thread associated with a receiving task, program code means for enabling the computer to examine the external message buffer for receipt of the external source message, program code means for enabling the computer to copy the external source message from the external message buffer to the receiving task, program code means for enabling the computer to copy a local source message into a shared memory buffer by a local sending task, program code means for enabling the computer to invoke a local notify system service module including passing a window number identifying the receiving task, program code means for enabling the computer to invoke the wake thread module awakening a thread associated with the window number, program code means for enabling the computer to examine the shared memory buffer for receipt of the local source message, and program code means for enabling the computer to copy the local source message from the shared memory buffer to the receiving task.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF AN EXAMPLE EMBODIMENT OF THE INVENTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Figure 1:
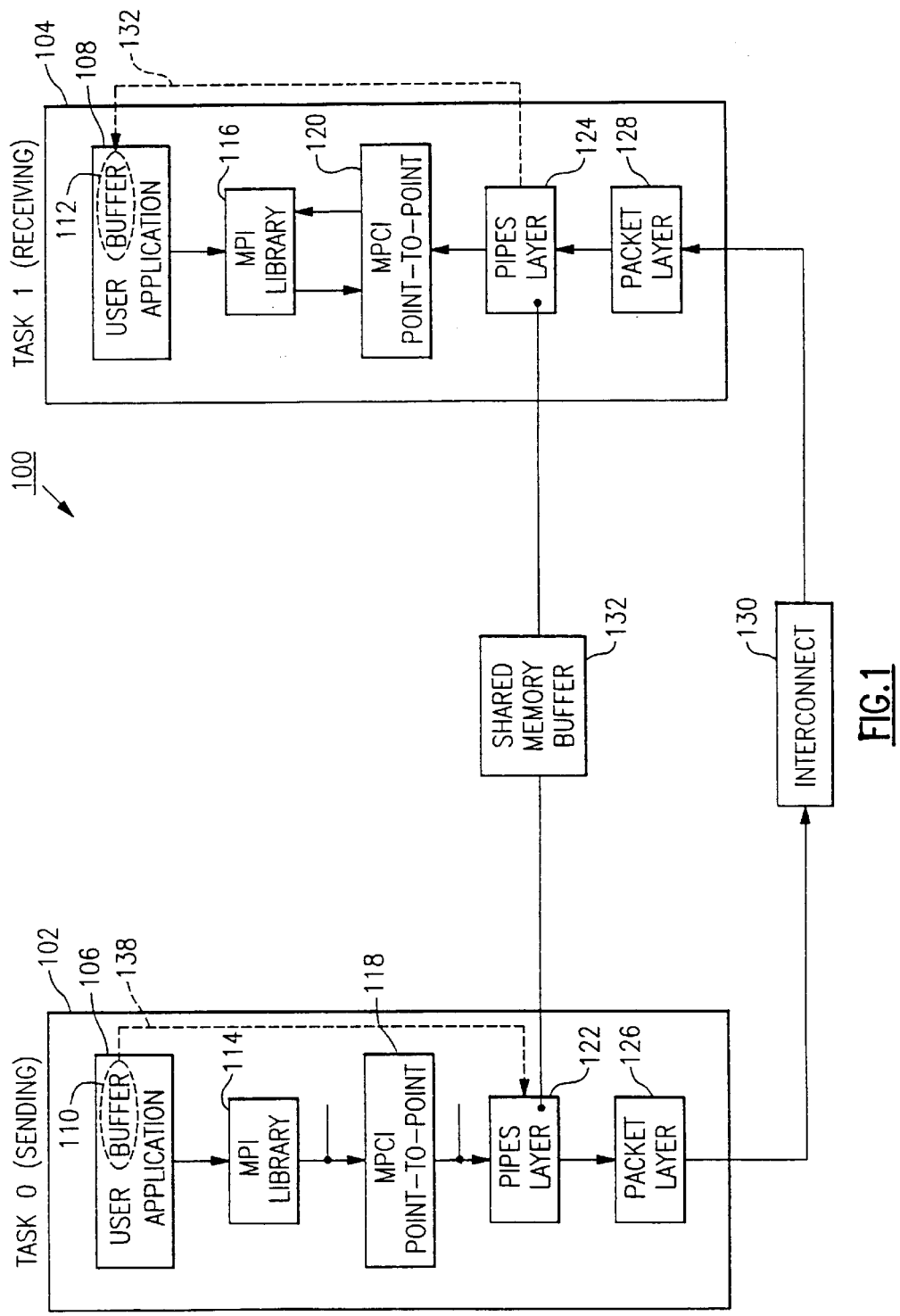
FIG. 1 depicts an exemplary block diagram illustrating a sending and receiving task using message passing according to an exemplary embodiment of the present invention.

FIG. 1 illustrates a diagram 100 including an example embodiment of two tasks, task 0 102 and task 1 104 communicating according to the message passing interface (MPI) standard. As shown, tasks 0 102 and 1 104 are on the same node. However, as will be apparent to those skilled in the art, the tasks 102, 104 can be associated with different nodes, see FIG. 2 below.

FIG. 1 is a block diagram 100 depicting an exemplary embodiment of a software protocol stack of the present invention including two interconnected tasks, task 0 102 and task 1 104, in communication. Task 0 102 as shown is sending a message and can be referred to as source task 102. Task 1 104 as shown is receiving a message and can be referred to as destination task 104. Tasks 102 and 104 can be part of an MPI job. Jobs can include various tasks which can all be in communication. Block diagram 100 depicts a two task job in which task 0 102 sends a message and task 1 104 receives the message. The arrows connecting software components 106–128 of the tasks represent the activities of sending and receiving. Every task 102, 104 has the ability to send and to receive. Thus, it will be apparent to those skilled in the art that the lines connecting the software components of tasks 102 and 104, although shown with arrows in only one direction, can more accurately be shown with arrows on both ends since communication is in both directions, since all tasks 102 and 104 can send and receive. However, for illustration purposes, communication will be discussed in only one direction, i.e., from source task, sending task 102 to destination task, receiving task 104, via interconnect 130.

Each task 102, 104 can include several software components 106–128, as shown in diagram 100. The various software components, or software layers 106–128 include communication protocols.

Regarding the specific software components, tasks 102 and 104 can include user applications 106 and 108, message passing interface (MPI) libraries 114 and 116, message passing client interface (MPCI) point-to-point components 118 and 120, pipes layers 122 and 124, and packet layers 126 and 128, respectively. In one embodiment, MPI libraries 114 and 116, MPCI point-to-point components 118 and 120, pipes layers 122 and 124, and packet layers 126 and 128 are all components of a parallel environment. Lower levels, i.e., MPCI point-to-point components 118 and 120, pipes layers 122 and 124, and packet layers 126 and 128, can in one embodiment be invisible to the user and can be used to carry out transport of data between tasks.

User applications 106 and 108, can include a user's application code used to solve a user's problem. Within user application 106 is data developed at task 102 which needs to be communicated to task 104. The data can reside in a buffer 110 of user application 106. Similarly, user application 108 can include a buffer 112 into which data can be distributed when received by task 104.

Pipes layer 122 can work with packet layer 126 to provide a reliable byte stream interface for point to point layer 118. Pipes layer 122 can copy some number of bytes from buffer 110. The data from buffer 110 can become contiguous bytes in a pipe so packets can be delivered to packet layer 126. When pipes layer 122 confirms that the packets from some portion of the pipe have been delivered, the data in the pipe is no longer needed and additional data can be copied from buffer 110 into the pipe.

Packet layer 126 can take data from pipes of pipes layer 122 and can collect the data into packets for shipping to the receiving task 104. Various packet layers can be used to transport the data between tasks 102 and 104. For example, packets can be sent via a user datagram protocol (UDP). Another example can use a "user space" mechanism for the IBM RISC System (RS) 6000 SP as described, e.g., in U.S. patent application Ser. No. 08/920,084, to Mirza, J. H., et al., entitled "Hardware Interface between a Switch and a Communication Subsystem in a Data Processing System," of common assignee to the present invention, the contents of which are incorporated herein by reference in their entireties.

The data in packets can be sent via interconnect 130 to the destination task 104, from source task 102. Interconnect 130 simply describes a means for transferring the data between the tasks. In one embodiment of the invention, a "user space" packet layer 126 can be used to transfer the data between tasks. User space is a mechanism available on the multiprocessor IBM RISC System 6000/SP that provides very high transfer rates. An alternative mechanism for transfer could be user datagram protocol (UDP). UDP provides a user datagram capability. Interconnect 130 represents how the data is actually carried from one task to the other including the physical devices and/or interfaces over which the data travels from the sending task 102 to reach the receiving task 104. In one embodiment, interconnect 130 can include a message passing network (MPN) which is designed for distant communication between tasks on multiple nodes. The interconnect 130 could use an SP switch which is a high speed, switched network with specialized communication adapters having bandwidth of, e.g., 150 MBps each, for an example aggregate bandwidth of 150× 256 MBps. In one embodiment, an SP can use a collection of a plurality of uniprocessors. In another embodiment, symmetric multiprocessors can be used using an N-way multiprocessor, including, e.g., a 16 or 24 way processor where the multiprocessors use a common memory. Where multiprocessors use shared memory, message passing can be accomplished by having a sending task 102 place a message in a shared memory buffer 132. Sending task 102 must then notify receiving task 104 of the message placed in shared memory. Unfortunately no conventional means exists for enabling transparent notification of receipt of a message in shared memory as well as notification of receipt of messages from external source tasks. The present invention, advantageously provides such means to transparently notify a receiving task of messages received from a multiplicity of sources.

Receipt at receiving task 104 can include identical components to sending task 102 performing receipt functions. Specifically, packet layer 128 can receive packets of data from interconnect 130 and can empty the packet contents into the pipes layer 124 which can interface with MPCI point-to-point 120 to place the received data into a buffer 112 of user application 108. It will be apparent to those skilled in the art that the layering system used to describe the present invention is only an example implementation embodiment and the novel technique of the present invention does not require the use of this layered approach. Further, the layered approach disclosed is only one example embodiment of possible layered approaches that would be apparent to those skilled in the art to implement the present invention in view of the disclosure presented herein.

Since a job can include multiple tasks, each task needs to be started and infrastructures for intercommunication as shown in block diagram 100 need to be started. In one embodiment, a user can set up a job by invoking a command. In a Parallel Environment (PE) of an exemplary embodiment of the present invention, a job can be set up to execute a user's application program code including sending task 102 and receiving task 104, by invocation of a command.

The reader is directed to the following documents, IBM Parallel Environment for AIX: Installation Guide, (GC28-1981), IBM Parallel Environment for AIX: Hitchhiker's Guide, (GC23-3895), IBM Parallel Environment for AIX: Operation and Use, Vol. 1, (SC28-1979), IBM Parallel Environment for AIX: Operation and Use Vol. 2, (SC28-1980), including Part 1: Debugging and Visualizing, and Part 2: Profiling, IBM Parallel Environment for AIX: MPI Programming and Subroutine Reference, (GC23-3894), IBM Parallel Environment for AIX: Messages, (GC28-1982), IBM Parallel Environment for AIX: Licensed Program Specifications, (GC23-3896), Message Passing Interface Forum, MPI: A Message-Passing Interface Standard, Version 1.1 University of Tennessee, Knoxville, Tenn., Jun. 6, 1995, and Message Passing Interface Forum, MPI-2; Extensions to the Message-Passing Interface, Version 2.0 University of Tennessee, Knoxville, Tenn., Jul. 18, 1997, the contents of which are incorporated herein by reference in their entireties.

Figure 2:
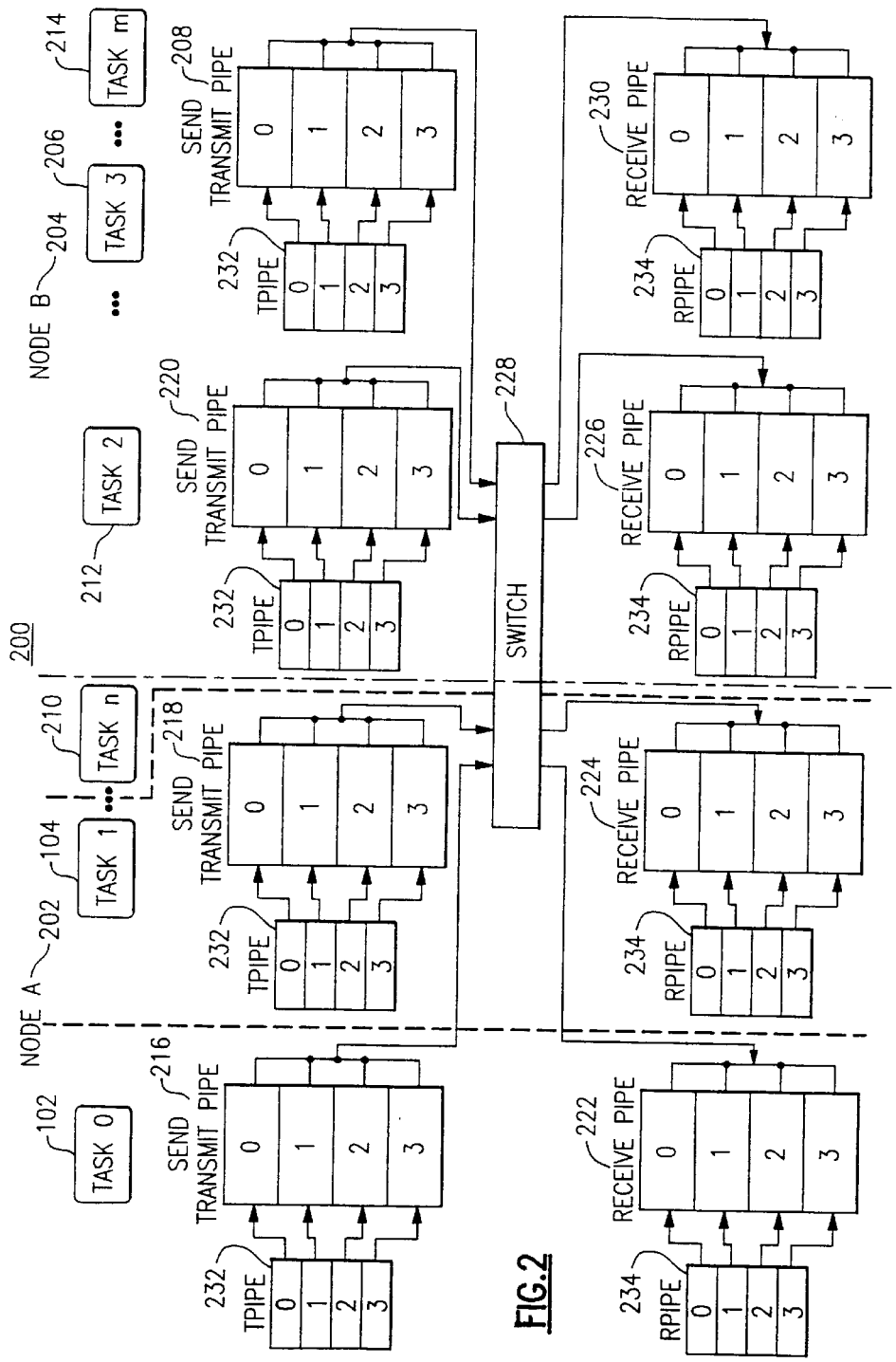
FIG. 2 depicts an example flow diagram illustrating internode and intranode multiple task message passing using transmit and receive pipes in an embodiment of the invention.

FIG. 2 depicts an example flow diagram illustrating internode and intranode multiple task message passing using transmit and receive pipes in an embodiment of the invention. FIG. 2 depicts diagram 200 including Node A 202 and Node B 204. Node A 202, as shown, includes task 0 102, task 1 104, . . . , and task n 210. Node B 204 includes task 2 212, task 3 206, . . . , and task m 214. Each task 102 can have a transmit pipe 216 and a receive pipe 222, and a tpipe 232 and rpipe 234. Pipes 216, 222 can communicate, for example, via switch 228, as discussed further below.

Figure 3:
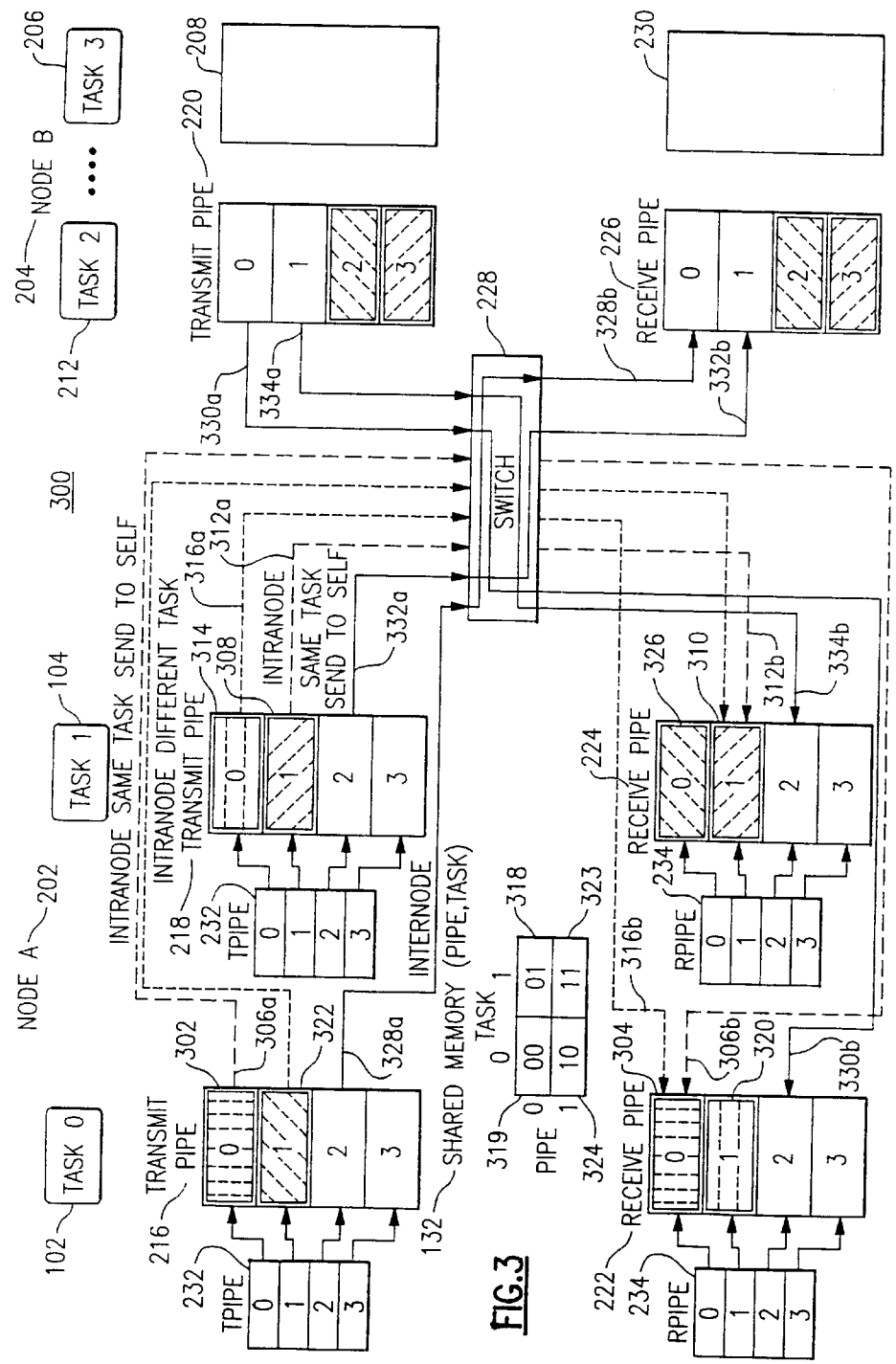
FIG. 3 depicts an example flow diagram illustrating internode and intranode multiple task message passing using shared memory buffers in an embodiment of the invention.

FIG. 3 depicts an example flow diagram illustrating internode and intranode multiple task message passing using shared memory buffers in an embodiment of the invention. FIG. 3 depicts diagram 300 including the contents of diagram 200, plus the addition of a shared memory buffer 132.

Intra-node Message Passing On A Same Task Overview

A task can send a message to itself, which can be done by using switch 228, internet protocol communication, (IP), or shared memory preferably using the technique of the present invention. As shown in FIG. 3, the dashed lines show the path for each task 0 102, sending a message to itself as shown by lines 306a and 306b from its transmit pipe 302 to its own receive pipe 304 via the switch 228. Task 1 104 is also shown sending a message to itself as shown by lines 312a and 312b from its transmit pipe 308 to its own receive pipe 310 via switch 228. The shared memory path is also shown in FIG. 3, illustrating an example embodiment of an application of the present invention assuming that tasks 0 and 1 are on one SMP node A202 and task 2 212 and task 3 206 are on another SMP node B204. Shared memory buffers 132 of (pipe, task), 00 buffer 319 and 11 buffer 323 can be used for tasks 0 102 and 1 104 to transmit data to themselves by using a memory to memory copy, preferably according to the present invention. Shared memory 00 buffer 319 can allow task 0 102 using pipe 302 to send a message to a local task or itself task 0 102 using pipe 304. Shared memory 11 buffer 323 can allow task 1 104 using pipe 308 to send a message to itself using task 1 using pipe 310.

Intra-node Message Passing On Different Tasks Overview

Several approaches can be used to accomplish message passing between different tasks including, e.g., using message passing via shared memory 132, the switch 248, and communicating via IP. The dotted line, 316a, 316b, shown in FIG. 3 indicates how the message can be sent from tasks 1 104 to task 0 102 via the switch 228, from pipe 314 to pipe 304 over lines 316a and 316b. Using shared memory 132, as depicted in FIG. 3 task 0 102 and task 1 104 can use the 01 buffer 318 and 10 buffer 324, to transmit data between tasks 102 and 104. Specifically, using the 01 buffer 318, task 1 104 is sender and task 0 102 is receiver, from pipe 314 to pipe 320, and using 10 buffer 324, task 0 102 is sender and task 1 104 is receiver, from pipe 322 to pipe 326.

Inter-node Message Passing Overview

The solid lines in FIG. 3 show the path 328a and 328b, and 330a and 330b, used by task 0 102 in NODE A 202 to send a message to and receive a message from task 2 212 in NODE B 204, and the path 332a and 332b, and 334a and 334b, used by task 1 104 in NODE A 202 to send a message to and receive messages from task 2 212 in NODE B 204.

As will be apparent to those skilled in the art, it is important to note that packet logic and byte tokens can be used for message passing via the switch 228 (or IP communication) but packet logic and byte tokens are not required, advantageously, if shared memory message passing is used.

Overview of Interrupts

When a packet arrives in the communications adapter 418, discussed further below with reference to FIG. 4, (and if the user space process is running with interrupts enabled), the communications adapter 418 can generate an interrupt to the multi-processor computer system. The interrupt can be serviced by a device driver which can inform kernel extension (KE) according to the present invention that a user space interrupt has occurred. The KE can check the PID of the user space process that owns the communications adapter 418. In one embodiment of the invention, the kernel extension can be merged into the device driver.

For the threaded library, the KE can look for a thread registered to receive interrupts from that window, and can call an et_post function to awaken it. The registered thread can be provided by the HAL and, once again, the MPCI layer 118 can register a function for the HAL to run when the thread is awakened.

Figure 4:
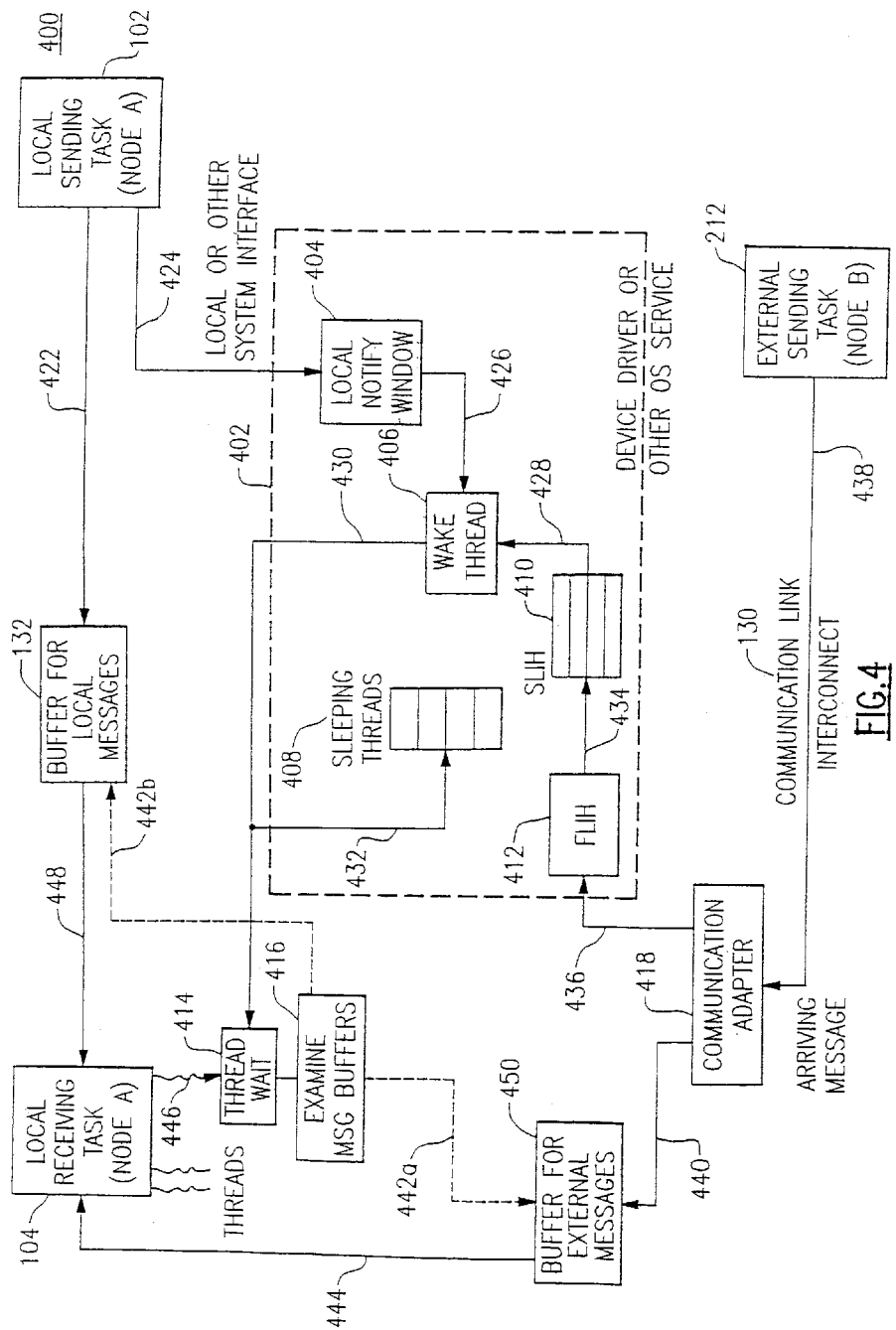
FIG. 4 depicts an example embodiment of an improved message receipt notification method and system of the invention.

Overview of Transparent Shared Memory Notification According to the Present Invention FIG. 4 depicts a block diagram 400 illustrating an example embodiment of the present invention and flows of data between software module and hardware components of the block diagram 400. The present invention enables transparent notification by a local sending task 102 to a local receiving task 104 of a message being sent from sending task 102 to receiving task 104 placed in the shared memory buffer 132. The method of the present invention can provide for transparent use of existing hardware interrupt handling mechanisms to service, advantageously, a software service request to provide, notification from sending task 102 of, something, such as, e.g., receipt of a message in a local shared memory buffer 132, being sent to the receiving task 104. Diagram 400 can include a sending task 102 that transmits a message to, by way of copying the message to shared memory, 132, and notifying, a receiving task 104 on the same node A 202. The shared memory message buffer 132 or queue is accessible by both the sender task 102 and the receiver task 104. Diagram 400 can further include a local notify system service module 404 implemented as an ioctl or other system interface, or as part of, e.g., a device driver 402, an operating system (OS) service, and middleware. The local notify system service module 404 can perform an advantageous local notification function of the present invention that can take a window number or port number as an argument from the calling task. External sending task 212 of Node B 204 can seek to transmit a message from the sending task 212 to the receiving task 104 over a communication link or interconnect 130 using the inter-node communication methods described above. Diagram 400 can further include a wake thread module 406 that can allow the calling task to wake a specific thread from a list of sleeping threads 408. Diagram 400 includes a second level interrupt handler module 410 that can call wake thread module 406 when invoked by a FLIH 412, also included in diagram 400. Diagram 400 can also include sleeping threads 408, identified by thread number and window/port number. First level interrupt handler (FLIH) 412 can decode hardware interrupt levels and can invoke one of a set of the second level interrupt handlers (SLIH) 410 based on the interrupt level of FLIH 412 and the port/window number associated with the interrupt. Diagram 400 also includes receiving task 104 that expects to receive notification, via the wake thread module 406, when an external event occurs, such as arrival of a packet 220a, 220c, 220e, and 220g. Diagram 400 can include a thread wait module 414 that puts the notification thread of receiver task 104 into the list of sleeping threads 408 and then sleeps until awakened. Diagram 400 includes an examine message buffers module 416 that can examine the message buffers 132 for local or external message buffer 450 for external messages. Diagram 400 can include message buffer 450 into which a communication adapter 418 (also shown) can copy incoming message packets 220a, 220c, 220e and 220g. Communication adapter 418 can conventionally copy incoming packets 220a, 220c, 220e, and 220g to external message buffer 450 and can generate a hardware interrupt, invoking the FLIH 412.

In addition to components 402–418 depicted in diagram 400, FIG. 4 also includes various exemplary data flows represented by lines linking the components together referred to now as "links" 422–438. Link 422 illustrates sender task 102 placing a message for receiver task 104 into the shared memory buffer 132. Link 424 illustrates sender task 102 invoking the newly supplied local notify system service module 404 (which can be an ioctl) which can pass the window number or port number of receiver task 104. All sender tasks 102 can know the window/port numbers of all the receiver tasks 104. Link 426 illustrates the local_notify system service module 404 calling the wake thread module 406 for the specified window. Link 428 illustrates the SLIH 410 invoking the wake thread module 406 based on its selection by the FLIH 412. Link 430 illustrates the sleeping thread 408 associated with the indicated window being awakened. Link 432 illustrates the thread waiting 414 for a message puts its ID into the sleeping thread table 408 at the appropriate spot and then goes to sleep. Link 434 illustrates the FLIH 412 invoking the SLIH 410 based on the interrupt level and window/port number indicated by the communication adapter 418. Link 436 illustrates communication adapter 418 causing an interrupt to occur which invokes FLIH 412. Link 438 illustrates an external message being sent from a sending task 212 on another node B 204 and arriving on communication link 130. Link 440 illustrates communication adapter 418 copying the arriving message into external message buffer 450. Link 442a illustrates that when awakened the previously sleeping thread examines 416 external message buffer 450 for any entry. Link 442b illustrates the thread examining 416 the shared memory buffer 132 advantageously according to the present invention. Link 444 illustrates data flows from external message buffer 450 or queue to the receiving task 104. Link 446 illustrates receiving task 104 creating a thread to wait for incoming data. Link 448 illustrates data flowing from the local buffer 132 to the receiving task 104, in accordance with the present invention.

Figure 5:
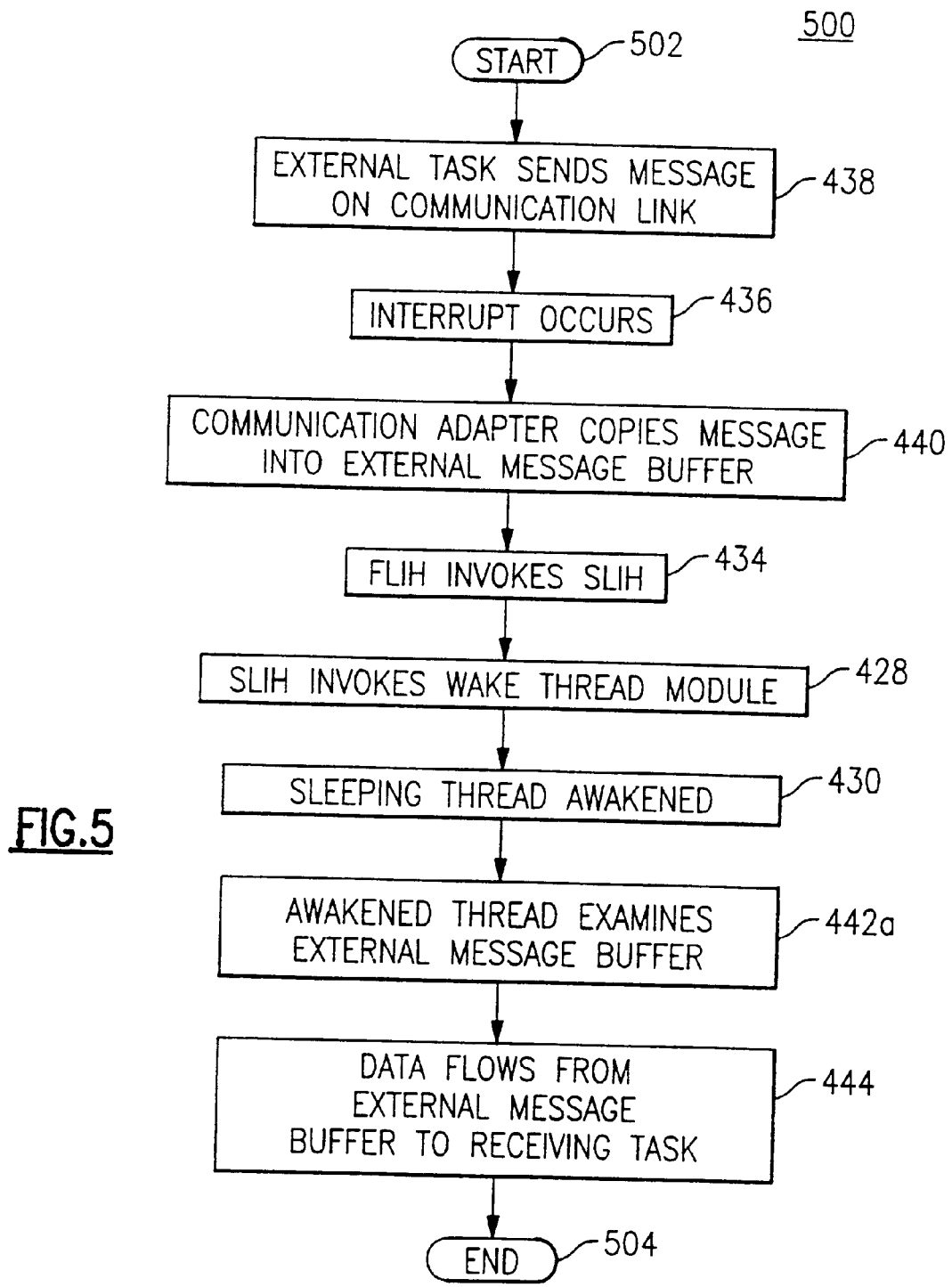
FIG. 5 depicts an example interrupt handling method of servicing a message received from an external source.

FIG. 5 illustrates flow diagram 500 depicting arrival of an external message from a sending task 212 on another node. Flow diagram 500 depicts a conventional hardware interrupt handling process for servicing a hardware interrupt such as, e.g., as depicted in the example application, handling an interrupt from a communications adapter 418 upon receipt of a message sent from an external sending task 212 on a separate Node B 204. Flow diagram 500 begins in an example embodiment with step 502 and can continue with step 438, step 436, step 440, step 434, step 428, step 430, step 442a, step 444 and can end with step 504.

Figure 6:
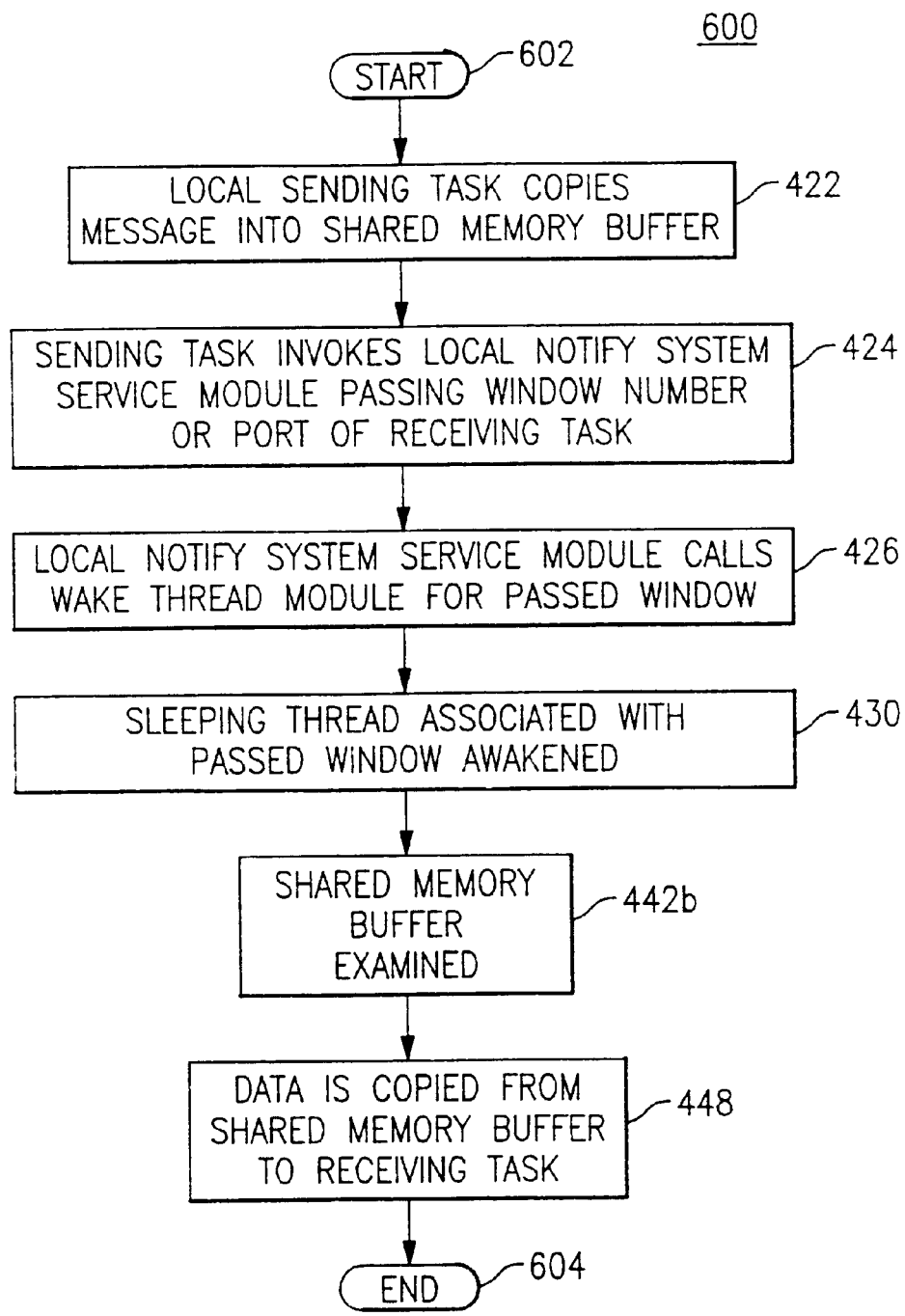
FIG. 6 depicts an example process illustrating the advantageous method of message receipt notification of shared memory message passing from a sending task from a local sender in an example embodiment of the present invention.

FIG. 6 illustrates a flow diagram 600 depicting an example embodiment of a technique of the present invention advantageously providing notification of receipt to a receiving task 104 of a local message in the shared memory buffer 132 from a local sending task 102 according to the present invention. Flow diagram 600 begins in an example embodiment with step 602 and can continue with step 422, step 424, step 426, step 430, step 416, step 442b, step 448, and can end with step 604.

In an example embodiment of the present invention, the platform can be any computer on which multiple processes can be run to exploit multiple processors which may not have access to a single common address space. It will be apparent to those skilled in the art that implementation is not limited to such an exemplary platform.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for transparently handling message passing from a plurality of local and external source tasks, the method providing a software routine that simulates handling of an occurrence of a hardware interrupt, the method comprising the steps of:

(a) copying a local source message into a shared memory buffer from a local sending task;

(b) invoking, by simulating a hardware interrupt, a local notify system service module including passing a window number identifying a receiving task;

(c) invoking, in response to the simulated hardware interrupt, a wake thread module awakening a thread associated with said window number;

(d) examining said shared memory buffer for receipt of said local source message;

(e) copying said local source message from said shared memory buffer to said receiving task;

(f) sending an external source message on a communications link by an external sending task;

(g) receiving said external source message from said communications link at a communication adapter;

(h) triggering a hardware interrupt by said communication adapter;

(i) copying said external source message into an external message buffer from said communication adapter:

(j) invoking a first level interrupt handler (FLIII) handling said hardware interrupt:

(k) invoking a second level interrupt handler (SLIH) handling said FLIH;

(l) invoking said wake thread module awakening a thread associated with said receiving task;

(m) examining said external message buffer for receipt of said external source message; and (n) copying said external source message from said external message buffer to said receiving task.

2. A system for message passing from a plurality of local and external sources, comprising:

a message passing network;

a plurality of nodes coupled to said message passing network;

a plurality of tasks executing on said plurality of nodes;

a local sending task of said plurality of tasks on a first of said plurality of nodes;

a receiving task of said plurality of tasks on said first of said plurality of nodes;

an external sending task on a second of said plurality of nodes;

an external source message handling service associated with said first of said plurality of nodes that enables said external sending task to pass an external source message from said external sending task to said receiving task, wherein said external sending task sends an external source message over said message passing network to a communication adapter associated with said first of said plurality of nodes, wherein said communication adapter can store said external source message in an external message buffer and creates a hardware interrupt, wherein said hardware interrupt invokes a first level interrupt handler (FLIH), wherein said FLIH invokes a second level interrupt handler (SLIH), wherein said SLIH invokes a wake thread module that wakes a thread associated with said receiving task that causes said receiving task to examine said external message buffer to receive said external source message; and a local notify system service associated with said first of said plurality of nodes that enables said local sending task to pass a local source message from said local sending task to said receiving task, including a copier module that copies said local source message to a shared memory buffer and a notification module that invokes said wake thread module that awakens a thread associated with said receiving task notifying said receiving task of said local source message in said shared memory buffer.

3. The system according to claim 2, wherein said local notify system service is part of a device driver.

4. The system according to claim 2, wherein said local notify system service is part of an operating system.

5. The system according to claim 2, wherein said local notify system service is part of a database management system.

6. The system according to claim 2, wherein said local notify system service is part of a middleware application.

7. A device driver for a system having an external source message handling service that enables an external sending task to pass an external source message from the external sending task to a receiving task, wherein the external sending task sends an external source message over a message passing network to a communication adapter associated with the receiving task, wherein the communication adapter stores the external source message in an external message buffer and creates a hardware interrupt, wherein the device driver comprises:

a local notify system service that enables a local sending task to pass a local source message from local sending task to the receiving task, including a copy module that copies said local source message to a shared memory buffer and creates a hardware interrupt, a first level interrupt handler (FLIH) responsive to the hardware interrupt, the FLIH invoking a second level interrupt handler (SLIH) wherein the SLIH invokes a wake thread module that wakes a thread associated with the receiving task that causes the receiving task to examine the external message buffer to receive the external source message, and a notification module that invokes the wake thread module that awakens a thread associated with the receiving task, and notifies the receiving task of said local source message in said shared memory buffer.

8. An operating system including a kernel having a plurality of system services for a system having an external source message handling service that enables an external sending, task to pass an external source message from the external sending task to a receiving task, wherein the external sending task sends an external source message over a message passing network to a communication adapter associated with the receiving task, wherein the communication adapter stores the external source message in an external message buffer and creates a hardware interrupt, wherein the hardware interrupt invokes a first level interrupt handler (FLIH), wherein the FLIH invokes a second level interrupt handler (SLIH), wherein the SLIH invokes a wake thread module that wakes a thread associated with the receiving task that causes the receiving task to examine the external message buffer to receive the external source message, wherein the plurality of system services comprises:

a local notify system service that enables a local sending task to pass a local source message from said local sending task to the receiving task, including a copy module that copies said local source message to a shared memory buffer and creates a hardware interrupt, a first level interrupt handler (FLIH) responsive to the hardware interrupt, the FLIH invoking a second level interrupt handler (SLIH), wherein the SLIH invokes a wake thread module that wakes a thread associated with the receiving task that causes the receiving task to examine the external message buffer to receive the external source message, and a notification module that invokes the wake thread module that awakens a thread associated with the receiving task, and notifies the receiving task of said local source message in said shared memory buffer.

9. A computer program product embodied on a computer readable media including program code means including program logic for transparently handling message passing from a plurality of internal and external sources, comprising:

program code means for enabling a computer to send an external source message on a communications link from an external sending task;

program code means for enabling the computer to receive said external source message from said communications link at a communication adapter, wherein said communication adapter triggers a hardware interrupt upon receipt of said external source message;

program code means for enabling the computer to copy said external source message into an external message buffer from said communication adapter;

program code means for enabling the computer to invoke a first level interrupt handler (FLIH) handling said hardware interrupt;

program code means for enabling the computer to invoke a second level interrupt handler (SLIH) handling said FLIH;

program code means for enabling the computer to invoke a wake thread module awakening a thread associated with a receiving task;

program code means for enabling the computer to examine said external message buffer for receipt of said external source message;

program code means for enabling the computer to copy said external source message from said external message buffer to said receiving task;

program code means for enabling the computer to copy a local source message into a shared memory buffer by a local sending task;

program code means for enabling the computer to invoke a local notify system service module including passing a window number identifying said receiving task;

program code means for enabling the computer to invoke said wake thread module awakening a thread associated with said window number;

program code means for enabling the computer to examine said shared memory buffer for receipt of said local source message; and program code means for enabling the computer to copy said local source message from said shared memory buffer to said receiving task.

* * * * *